Figure 1:
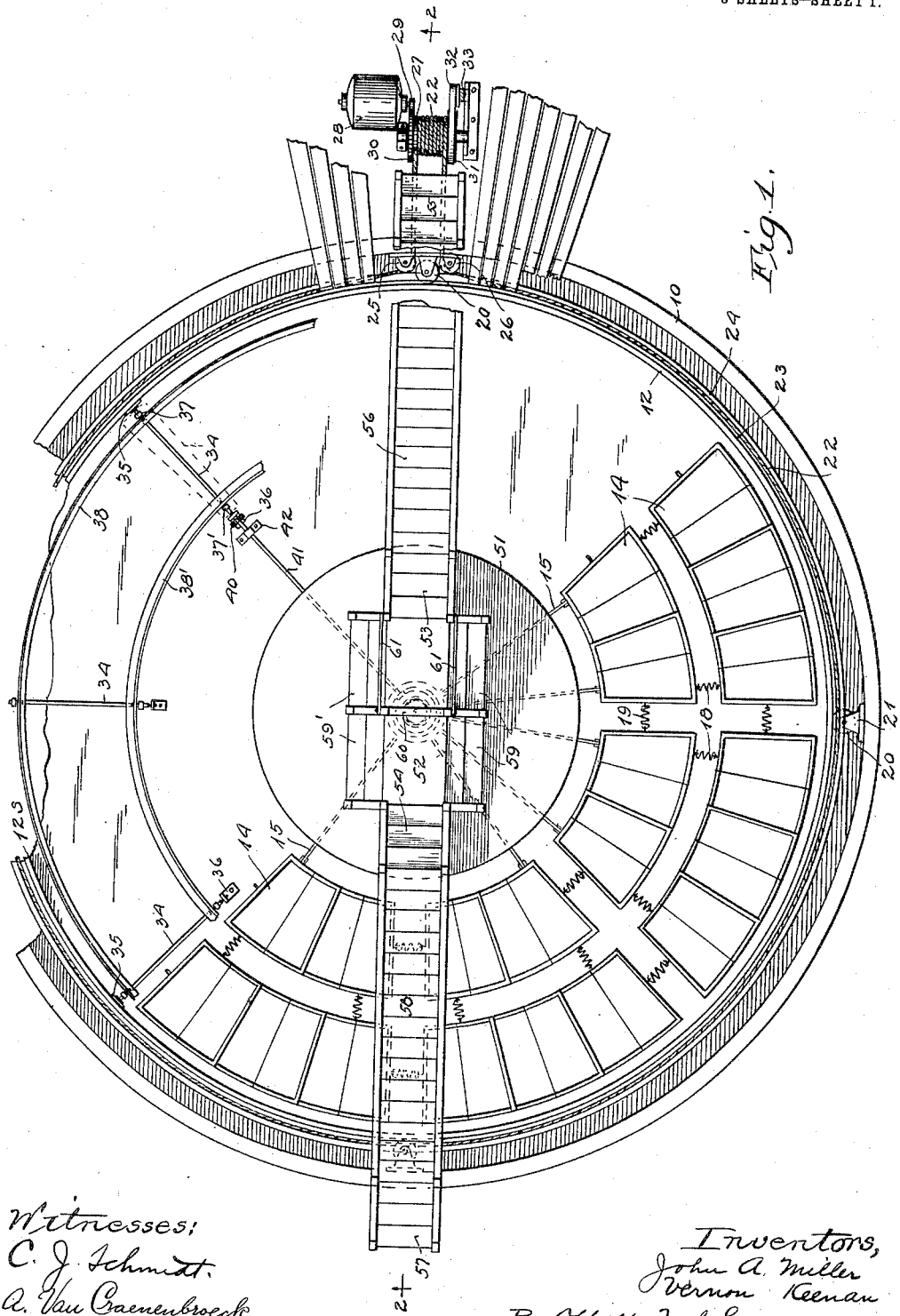

J. A. MILLER & V. KEENAN.
AQUATIC PLEASURE STRUCTURE.
APPLICATION FILED NOV. 29, 1912.

1,076,779.

Patented Oct. 28, 1913.

3 SHEETS—SHEET 1.

Witnesses:
C. J. Schmitt.
A. Van Caenenbroeck.

Inventors,
John A. Miller
Vernon Keenan
By Offield, Towle, Graves & Offield
Attys.

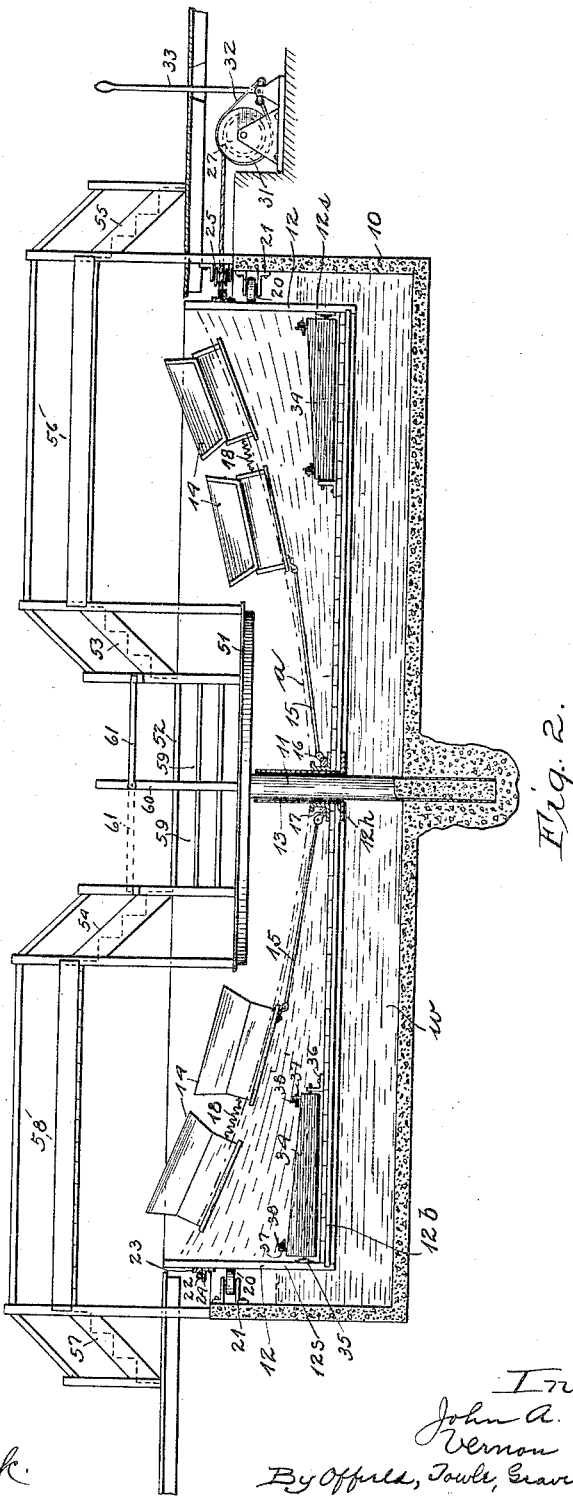

J. A. MILLER & V. KEENAN.
AQUATIC PLEASURE STRUCTURE.
APPLICATION FILED NOV. 29, 1912.
1,076,779.
Patented Oct. 28, 1913.
3 SHEETS—SHEET 3.
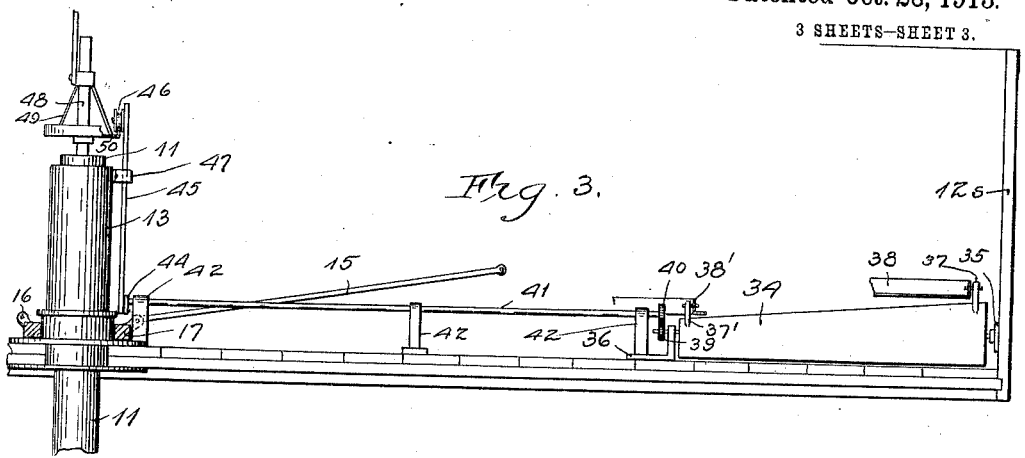
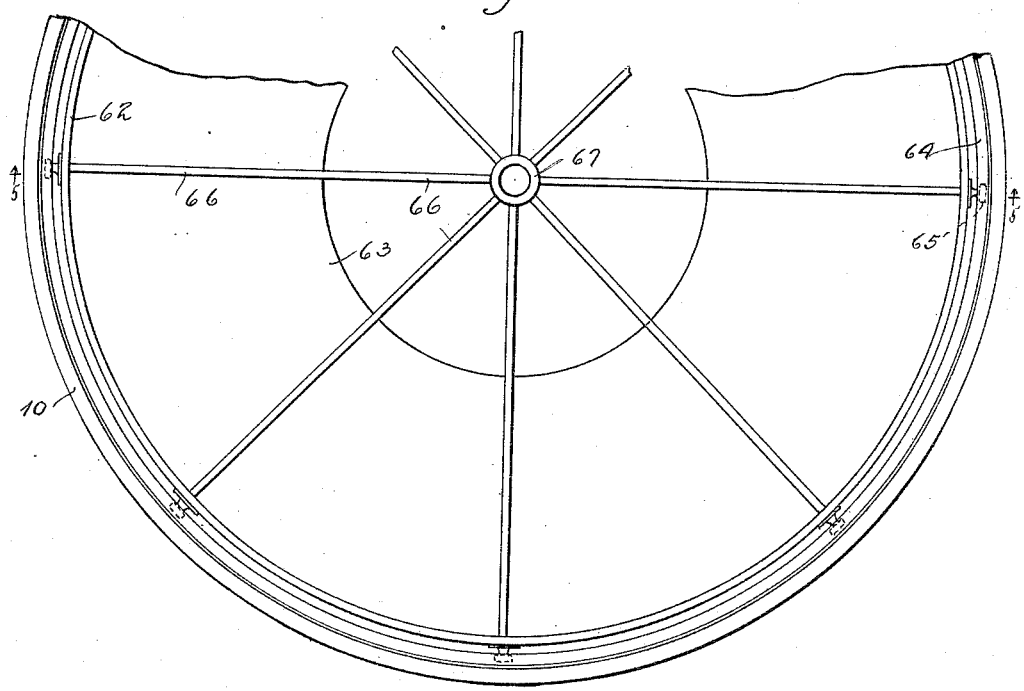
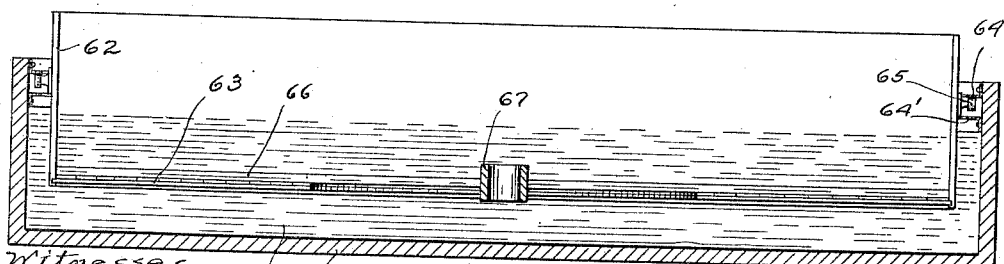

UNITED STATES PATENT OFFICE.

JOHN A. MILLER, OF HOMEWOOD, ILLINOIS, AND VERNON KEENAN, OF CINCINNATI, OHIO.

AQUATIC PLEASURE STRUCTURE.

1,076,779. Specification of Letters Patent. Patented Oct. 28, 1913.

Application filed November 29, 1912. Serial No. 733,964.

*To all whom it may concern:*

Be it known that we, JOHN A. MILLER, a resident of Homewood, in the county of Cook and State of Illinois, and VERNON KEENAN, a resident of Cincinnati, in the county of Hamilton and State of Ohio, have invented certain new and useful Improvements in Aquatic Pleasure Structures, of which the following is a specification.

Our invention relates to an improved aquatic pleasure structure to be installed in parks, amusement resorts, or the like, to afford pleasure in the same manner as pleasure railways and similar devices.

Among the important features of the invention are to provide means for rotating a body of water about a center so that centrifugal force will cause a whirlpool effect and its upper surface will slope downwardly from the outer margins toward the center; to provide controllable obstructions or baffle members in the path of the water so that the water may be roughened to any desired extent and give a wave effect; to provide an arrangement whereby boats or floats may ride on and with the traveling water and follow and respond to the various movements thereof occasioned by the obstruction members; to provide convenient loading and unloading arrangement for passengers; structurally to provide a receptacle for a body of water and improved means for revolving the receptacle about an axis to carry the water with it and to cause the centrifugal force to bank the water toward the outer edges of the receptacle; to provide means whereby the receptacle may be retarded after the water has been given a desired speed whereby there will then be relative movement between the receptacle and the water; to provide controllable obstruction or baffle members as part of the receptacle so that upon relative movement between the water and the receptacle the water can be obstructed and controlled to be more or less violently agitated or to assume movement at its surface thus affording pleasure to occupants of the boats; to provide improved sustaining or supporting means for the receptacle, such sustaining means being preferably a fluid contained in a tank or pit, on which fluid the revolving structure will float, such suspension uniformly sustaining the revolving structure without putting it to strain, and such sustaining means being practically devoid of friction and easily controlled; to provide improved axis structure for centering the revolving structure in the sustaining tank or pit and about which the revolving structure may travel; to provide an arrangement whereby radial rows of boats are yieldingly coupled together and anchored toward the axis so that they may freely follow the vertical and circular movements of the water but are prevented from reaching the outer wall of the revolving receptacle; to provide a stationary loading platform either at the center of the revolving vehicle or at the outside thereof and to so arrange the loading structure that passengers may readily enter and leave the amusement device without interference or accident; to provide centrally located controlling mechanism for adjusting the obstruction of baffle members to give the desired water movements; to provide improved driving mechanism for revolving the receptacle preferably in the form of a cable belt looped about the receptacle periphery and about a driving wheel or drum driven by a suitable motor; and in general to provide a device of the above character which will give pleasure and amusement and which is entirely safe.

A construction embodying the various features of the invention is clearly illustrated on the accompanying drawings, in which—

Figure 1 is a plan view of the structure showing the boats removed from one-half thereof to more clearly reveal the interior arrangement; Fig. 2 is a sectional view taken from plane 2—2, Fig. 1; Fig. 3 is an enlarged side elevational view showing the manner of adjusting the water controllers; Fig. 4 is a plan view of a modified arrangement, and Fig. 5 is a sectional view taken from plane 5—5, Fig. 4.

Referring to Figs. 1 and 2, 10 represents a tank or pit built preferably of concrete. At the center of the tank is a post 11 extending upwardly to form an axis for revolving mechanism. This post may be an iron pipe filled with concrete. The pit contains water $w$ which floats the tub-shaped receptacle 12 having the bottom $12^b$ and the annular side wall $12^s$. The bottom $12^b$ has the hole $12^h$ at its center in which is securely fitted at its base a sleeve 13 which fits about the post 11 so that the receptacle may readily revolve about this post as an axis, the entire weight of the receptacle and contents being, however, held up by the water in the pit. The tub structure contains water $a$ whose level is some distance below the top of the wall $12^s$. Suitable means, to be described later, are provided for revolving the tub structure so that centrifugal force acting on the water $a$ will cause the water to bank toward the wall $12^s$ so that its surface will be dished more or less in imitation of a whirlpool. Suitable passenger carrying devices, such as boats 14, are provided and arranged to be supported on the water and to travel therewith when the tub structure revolves. Any number of such boats may be provided but in order to utilize the structure to its capacity, radial rows of boats are provided, as best shown in Fig. 1 where two complete circles of boats are provided. Any number of circles could of course be provided depending upon the size of the structure. These boats traveling with the water will move vertically to follow the vertical movements of the water as the revoluble speed of the water and consequently the centrifugal force changes. The boats will also tend to respond to the centrifugal force and to move outward radially, and to prevent the boats from rubbing against or striking the tub structure wall $12^s$, suitable anchoring means are provided. As shown, an anchor bar 15 extends inwardly toward the revolving axis from each radial row of boats. At their inner ends these anchor rods are each pivoted to lugs 16 provided on a ring 17 encircling the sleeve 13 and free to rotate relative thereto. The anchor members are preferably pivoted at their outer ends to only the inner boat of the radial rows, the other boats of each row being then preferably yieldably coupled together by spring links 18. Likewise adjacent boats of each circle are flexibly coupled together by means of spring links 19. The boats are then free to follow the various movements of the water and to do so independently of each other on account of the flexible couplings. The anchor members will however prevent the outer boats from ever reaching the retaining wall $12^s$. The loose engagement of the anchor ring 17 on the sleeve 13 will allow the boats to continue traveling even though the tub structure itself is braked or stopped, suitable braking means to be described later, being provided for retarding the travel of the tub structure. When the tub structure is stopped, the water and the boats will gradually stop revolving and will assume normal level position. To assist in keeping the tub structure in the center of the pit and to relieve the post 11 of strains, guide rollers 20 are pivoted in brackets 21 applied at intervals to the inner face of the pit, these rollers being engaged by the walls $12^s$ to keep the tub structure properly centered with reference to the axis structure. Any suitable means may be provided for revolving the tub structure. As shown, a cable 22 loops about the wall $12^s$ of the tub structure, this cable bearing against the band 23 and held in register with the band by the ledge 24. The cable passes about sheaves 25 and 26 and coils about the drum 27. To drive this drum any suitable drive device may be provided as for example, an electric motor 28, and the shaft has a drive pinion 29 engaging with the gear 30 fast with one end of the drum. When the drum is driven, the endless cable will travel and will carry with it the tub structure. In order to brake and to stop the tub structure, suitable brake mechanism may be provided. The brake mechanism shown comprises a brake wheel 31 connected with the drum end, a brake strap 32 encircling the wheel, the ends of this brake strap being connected with a lever 33 in a well known manner so that when the lever is swung down the strap will be tightened about the brake wheel and the travel of the cable retarded or stopped. With the arrangement described, if it is desired to start and revolve the tub structure, the brake strap is loosened and the motor connected in circuit and controlled to gradually start to drive the drum so that the cable by its frictional engagement with the tub structure will revolve the structure. To retard or to stop the structure, the motor is disconnected from circuit and the brake mechanism actuated to retard the drum and thus through frictional engagement of the cable turns with the drum, the cable will be prevented from traveling at the same speed as the tub structure and owing to friction, the tub structure will be gradually stopped. Thus after the tub structure has been brought to considerable speed, the brake can be suddenly applied to bring the tub structure to a quick stop, and water and boats, however, continuing their movement until they also finally come to rest. When the tub structure is started, it will take considerable time to bring the water to the same speed unless provision is made for dragging the water along in addition to the natural friction of the water against the tub sides. We therefore provide paddles or blades on the tub structure for engaging with the water to drag the water with the tub structure to bring it to the same speed in a very short time, said paddles or blades being also adapted to act as obstructions when the tub structure is suddenly stopped as the water continues revolving, the water being under these conditions more or less agitated, depending on the relative speed, and the blade members are adjusted so that they will cause the formation of waves during travel of the water thereover. The construction and arrangement of the paddle or blade mechanism is best shown in Fig. 3. Each paddle or blade 34 is trunnioned at one end in a bracket 35 secured to the wall 12$^s$ and at its inner end is trunnioned in a bracket 36 secured to the tub structure floor. Ears 37 and 37' extend upwardly from one edge of each blade and pivoted to the outer ears of all the blades is a ring 38 and pivoted to all the inner ears is a ring 38', so that rotation of one blade on its trunnions will effect similar rotation of all the other blades. The trunnion shaft of one blade carries at its inner end a gear 39 which meshes with a driving gear 40 on the outer end of a shaft 41 journaled in bearing frames 42 secured to the tub structure floor. The inner end of the shaft 41 has a crank arm 44 to which is pivoted the vertical connecting rod 45 whose upper end pivots a grooved wheel 46, the connecting rod being guided in bracket 47 secured to the sleeve 13. Upon raising and lowering of the rod 45 shaft 44 is turned and the blades 34 are correspondingly rotated. On a guide rod 48 extending upwardly from the top of the stationary post 11 a frame 49 is slidably mounted and carries the circular rail 50 which is engaged by the wheel 46. This frame remains stationary and as the tub structure revolves the wheel structure travels around the rail and upon raising and lowering of the frame connecting rod 45 is raised and the blades can thus be adjusted at any time during the operation of the device. When the tub structure is to be revolved, the blades are raised to vertical position so as to engage the water and drive it and force it along with the revolving tub so that the water will soon have practically the same speed as the tub structure. After the water has thus been set to revolving, the natural friction of the water against the tub structure would keep it in step with the tub structure and the blades can then be moved to horizontal position. However, to afford greater excitement and pleasure, the blades are raised after the water has been started to full speed and the tub structure has been suddenly retarded or stopped, the water then continuing to revolve to be agitated by its passage over the blades. By proper setting of the blades at certain angles, the water traveling thereover can be caused to assume wave motion and thus while the water is traveling relative to the tub structure, the blades can be set in various positions to create a regular wave effect or a more choppy effect, all of which affords considerable excitement to the passengers. Suitable exit and entrance structure is also provided so that passengers may safely enter and leave the structure and the boats. Such structure may be along the outside of the tub structure or as shown, may extend diametrically across the structure. As shown, a circular main platform 51 is mounted on the top of stationary post 11 and carries an intermediate platform 52 to one end of which leads an entrance stairway 53 and from the opposite end of which leads an exit stairway 54. Spanning the tub structure on one side between the stairway 53 and the outer stairway 55 is a bridge 56 and spanning the opposite side of the tub structure between the stairways 54 and 57 is a bridge 58. Stairways 59 and 59' lead from the opposite sides of the intermediate platform to the main platform 51 and a railing 60 bisects the intermediate platform and stairs 59 and 59' into entrance and exit sides. Suitable pivoted bars 61 may be provided for shutting off or opening up the various stairways as desired in order that in-coming and out-going passengers will not interfere with each other. In order to prevent the inner boats from touching the platform 51, the anchor bars 15 are preferably of rigid material and stiff enough to hold the boats away from the platform at all times. The bridges 56 and 58 are of course of sufficient height so that persons standing up in the boats will not be struck.

In Figs. 4 and 5 a modified arrangement is shown. In this arrangement the tub structure 62 is cylindrical but the inner portion of its bottom is removed to leave only the annular bottom 63. This tub is set into a pit 10 similar to the pit shown in Figs. 1 and 2 and in which there is water $w$, the water also entering tub 62. If the tub structure 62 is of wood, it will tend to float in the water and to keep it at the proper depth so that it will be better balanced during revolving, an abutment track 64 is provided on the inner face of the pit 10 against which rollers 65 on the tub structure engage. The lower rail 64' may also be provided for the rollers to prevent the tub structure from sinking too far into the water. Radial supporting beams 66 for the tub will extend from a central hub 67 which engages about a post 11 in the same manner as is shown in Figs. 1 and 2. With this arrangement, when the tub is revolved, the water over the floor 63 will be drawn along and as the water moves from the center of the tub and banks around the sides thereof, part of the water will be drawn from the pit into the tub structure. Adjustable blades can be provided just as in Figs. 1 and 2 and the same form of driving means and brake mechanism can be provided.

The closed tub structure of Figs. 1 and 2 could of course be supported on a track like the structure of Figs. 4 and 5 instead of being floated. However, supporting the tub structure by flotation is very desirable as the tub will be more uniformly supported at all points and will be more free from strains.

It is evident that a device of the above character will afford considerable amusement and excitement and is yet entirely safe. The surface of the water can be caused to change gradually or suddenly as the controller blades are adjusted.

We do not desire to be limited to the precise construction and arrangement and operation shown and described as it is evident that changes and modifications are possible which would still come within the scope of the appended claims. These claims are the following:

1. In a pleasure structure, the combination of a body of water, means for rotating said body of water about a center, and water craft supported on said body of water to travel therewith independently of said rotating means.

2. In a pleasure structure, the combination of a body of water, means for rotating said body of water to revolve about a center, means arranged in the path of the water for agitating said water, and water craft supported on said water to travel therewith and to follow the movements thereof independently of said rotating means.

3. In a pleasure structure, the combination of a retaining structure, a body of water confined by said structure, means for rotating said structure about a center, means for causing the water within said structure to travel therewith and on account of centrifugal force to slope upwardly toward the outer edge of said structure, and passenger supporting devices adapted to travel with said water and to follow the various movements thereof.

4. In a pleasure structure, the combination of a circular carrier having a bottom wall and a surrounding side wall, a body of water confined by said walls, means for revolving said carrier about a center, baffle members on said carrier for engaging with the water to cause revolving thereof with said carrier whereby centrifugal force will cause the water to bank toward said surrounding wall, and passenger supporting craft adapted to ride on said water to follow the movements thereof.

5. In a pleasure structure, the combination of a circular carrier having a bottom wall and a surrounding side wall, a body of water confined by said walls, means for revolving said carrier about a center, baffle members on said carrier for engaging with the water to cause revolving thereof with said carrier whereby centrifugal force will cause the water to bank toward said surrounding side wall, said baffle members being adjustable, and water craft adapted to ride on said water to follow the movements thereof.

6. In a pleasure structure, the combination of a confining member comprising a bottom and a surrounding side wall, water within said confining member, drag members on said confining member for causing the water therein to revolve therewith, means for braking said confining member whereby inertia may cause said water to continue to revolve relative to said drag members, and means for effecting adjustment of said drag members.

7. In a pleasure structure, the combination of a containing structure, means for supporting said structure for revoluble movement, means for effecting the revolution of said structure, and a plurality of water controlling members on said revolving structure controllable simultaneously from a common point to agitate said water during movement of said water relative to the containing structure.

8. In a pleasure structure, the combination of a body of water, means for causing said water to revolve about a center, water craft supported on said water, and means for limiting the radial movement of said craft, said craft being otherwise free to travel with said water or relative thereto.

9. In a pleasure structure, the combination of an axis structure, an annular confining member adapted to be revolved about said axis structure, means for effecting such revolution, water within said confining member adapted to be dragged with said confining member to revolve therewith, water craft supported on said water, and means for limiting the radial movement of said craft but for otherwise allowing travel of said craft through said water or independently thereof and of said confining member.

In witness whereof, we hereunto subscribe our names, this 23d day of November, A. D., 1912.

JOHN A. MILLER.
VERNON KEENAN.

Witnesses:
 MABEL S. THOMPSON,
 W. F. NEELY.

---

Copies of this patent may be obtained for five cents each, by addressing the "Commissioner of Patents, Washington, D. C."